United States Patent [19]

Eom

[11] Patent Number: 5,442,596
[45] Date of Patent: Aug. 15, 1995

[54] RECORDING/REPRODUCING APPARATUS HAVING A MAGNETIC HEAD WHICH IS OPENED AND CLOSED TOGETHER WITH A DOOR

[75] Inventor: Jae-yong Eom, Seoul, Rep. of Korea

[73] Assignee: Samsung Electronics Co., Ltd., Kyungki-Do, Rep. of Korea

[21] Appl. No.: 120,767

[22] Filed: Sep. 15, 1993

[30] Foreign Application Priority Data

Sep. 15, 1992 [KR] Rep. of Korea ............... 92-16726

[51] Int. Cl.⁶ .................. G11B 11/00; G11B 33/02
[52] U.S. Cl. ............................ 369/13; 369/75.2; 360/114
[58] Field of Search ................ 369/13, 14, 270, 244, 369/215, 219, 220, 126, 77.2, 75.1, 75.2; 360/59, 114; 365/122

[56] References Cited

U.S. PATENT DOCUMENTS

| | | | |
|---|---|---|---|
| 4,740,937 | 4/1988 | Watanabe | 369/13 |
| 5,226,024 | 7/1993 | Mukawa | 369/13 |
| 5,247,496 | 9/1993 | Yamatani | 369/13 |
| 5,268,882 | 12/1993 | Mukawa | 369/13 |

FOREIGN PATENT DOCUMENTS 0257488 10/1990 Japan.

*Primary Examiner*—Ali Neyzari
*Attorney, Agent, or Firm*—Sughrue, Mion, Zinn, Macpeak & Seas

[57] ABSTRACT

A recording/reproducing apparatus for a magneto-optical disk includes an optical pickup a magnetic head, to record and reproduce information. The apparatus includes a connecting member for making the magnetic head move together with the optical pickup, and also open and close together with a door. The apparatus also includes a plate spring for pressing the magnetic head so that the magnetic head is elastically in contact with the magneto-optical disk. The apparatus can be slimmed in size because the magnetic head is opened and closed together with the door. Also, since the magnetic head is in contact with the magneto-optical disk, the distance therebetween does not vary.

2 Claims, 4 Drawing Sheets

RECORDING/REPRODUCING APPARATUS HAVING A MAGNETIC HEAD WHICH IS OPENED AND CLOSED TOGETHER WITH A DOOR

BACKGROUND OF THE INVENTION

The present invention relates to a recording/reproducing apparatus for a magneto-optical disk and which records and reproduces information on and from a magneto-optical disk using a magnetizing device for applying an external magnetic field to the magneto-optical disk and an optical pickup for irradiating a laser beam onto the magneto-optical disk, and more particularly to a recording/reproducing apparatus for a magneto-optical disk wherein the magnetizing device simply ascends and descends and moves together with the optical pickup while being in contact with the magneto-optical disk.

A magneto-optical disk medium has a recording layer with a vertical anisotropy in which a magnetization direction is arranged in a vertical direction with respect to the surface of the disk by an external magnetic field. The recording layer is made of a magnetic body such as TbFe or TbFeCo.

In the state that the recording layer is magnetized in a certain direction, if a magnetic field is applied in the opposite direction thereof, and the temperature of a portion of the recording layer is raised above the Curie point, the magnetic field is magnetized (written) in the opposite direction when the magnetization state of the temperature-raised portion is demagnetized (erased) and the portion returns to the normal temperature. Also, when the recording layer is irradiated with light, the recording layer has a characteristic of rotating the surface of a polarized light wave by the Kerr effect at the portion where the magnetization direction is reversed.

Therefore, in the magneto-optical recording method, the recording of intended information can be carried out by using a magnetization device such as an electromagnet for applying an external magnetic field to the magneto-optical disk medium, and a light irradiating device for outputting a laser beam having a certain energy. Also, the recorded information can be reproduced by detecting the reflected laser beam of which the polarized wave surface is rotated.

FIGS. 1 and 2 illustrate a recording/reproducing apparatus of a conventional magneto-optical disk for recording and reproducing the information with respect to the magneto-optical disk medium.

In FIG. 1, a magneto-optical disk 2, which is held in a cartridge 2' rotates while being accommodated in a cartridge holder 5 and mounted on a turntable 1a of a spindle motor 1. An optical pickup 7 is placed under the rotating magneto-optical disk 2. Optical pickup 7 is moved by a motor (not shown) and is loaded on a carriage which moves in a radius boundary of disk 2. Over magneto-optical disk 2 is installed a bias magnet 3. Bias magnet 3, as shown in FIG. 2, is supported by a pin 3a which is inserted into a guide slot 6a of a guide wall 6 which is installed on the upper surface of holder 5, and a lever 8 which connects the upper surface with frames 4 and 4'. Accordingly, bias magnet 3 is raised and lowered by the movement of holder 5, so as to be moved closer to magneto-optical disk 2.

Bias magnet 3 is installed to be loaded and unloaded by pin 3a and guide slots 6a in guide wall 6 formed on the top of the cartridge holder 5 installed on frames 4 and 4' to be movable horizontally and vertically, along with the loading and unloading of the cartridge holder 5.

Here, in the conventional recording/reproducing apparatus for a magneto-optical disk, the mechanism for raising and lowering the bias magnet 3 is complicated, such that the apparatus cannot be embodied in a slim size. Also, physical tolerances between guide slots 6a and pin 3a of bias magnet 3 connected thereto allow bias magnet 3 to teeter by as much as the tolerance. Since bias magnet 3 is fixed with respect to magneto-optical disk 2 while being spaced apart by a predetermined distance, they cannot keep their distance fixed due to the vibration of the magneto-optical disk 2.

SUMMARY OF THE INVENTION

Therefore, it is an object of the present invention to provide a recording/reproducing apparatus for a magneto-optical disk in which the structure for raising and lowering a magnetization device for applying a magnetic field to a magneto-optical disk is improved to enable the apparatus to have a slim size.

It is another object of the present invention to provide a recording/reproducing apparatus for a magneto-optical disk in which a distance between the magnetization device and the magneto-optical disk is constantly maintained.

To achieve the above objects, there is provided an information recording/reproducing apparatus for a magneto-optical disk having a disk driver for rotating a magneto-optical disk medium, an optical pickup for irradiating a light beam on one side of the rotating disk medium and detecting a signal from the reflected light, and a magnetization device for applying a magnetic field to the other side of the disk medium, the recording/reproducing apparatus comprising:

a housing for accommodating the disk driver and the optical pickup and having an opening for enabling the disk medium to be loaded on and unloaded from the disk driver;

a door which is rotatably hinged with one side of the housing so as to open and close the opening of the housing; and means for supporting the magnetization device on the door so that the magnetization device is positioned farther from or closer to the loaded disk according to the opening and closing, respectively, of the door.

In the apparatus of the present invention, the magnetization device is installed on the door to open and close together with the door, thereby raising and lowering the magnetization device. Accordingly, a separate structure for raising and lowering the magnetization device is not required. Thus, the present invention enables the apparatus to be slim. Also, in the present invention, a simple spring is installed between the door and the magnetization device so that the magnetization device is elastically contacted to the magneto-optical disk. Accordingly, a problem in that the distance from the magneto-optical disk varies can be solved.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE INVENTION

Figure 1:
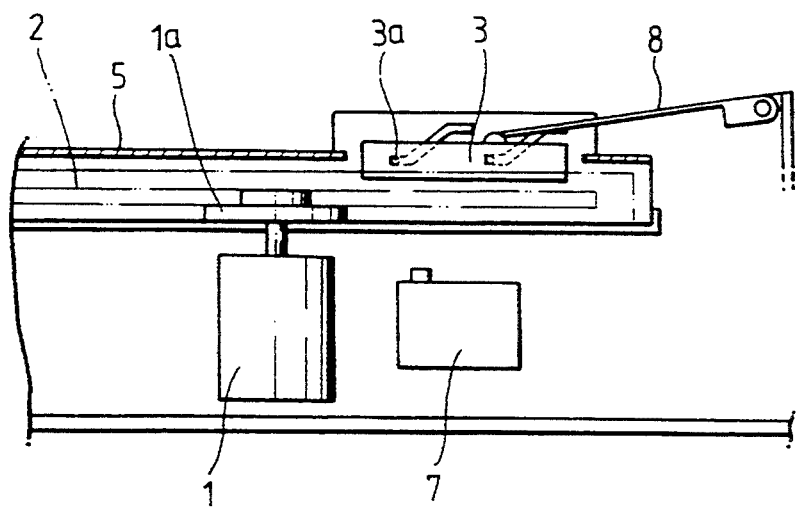
FIG. 1 is a schematic cross-sectional view of a conventional recording/reproducing apparatus for a magneto-optical disk.
Figure 2:
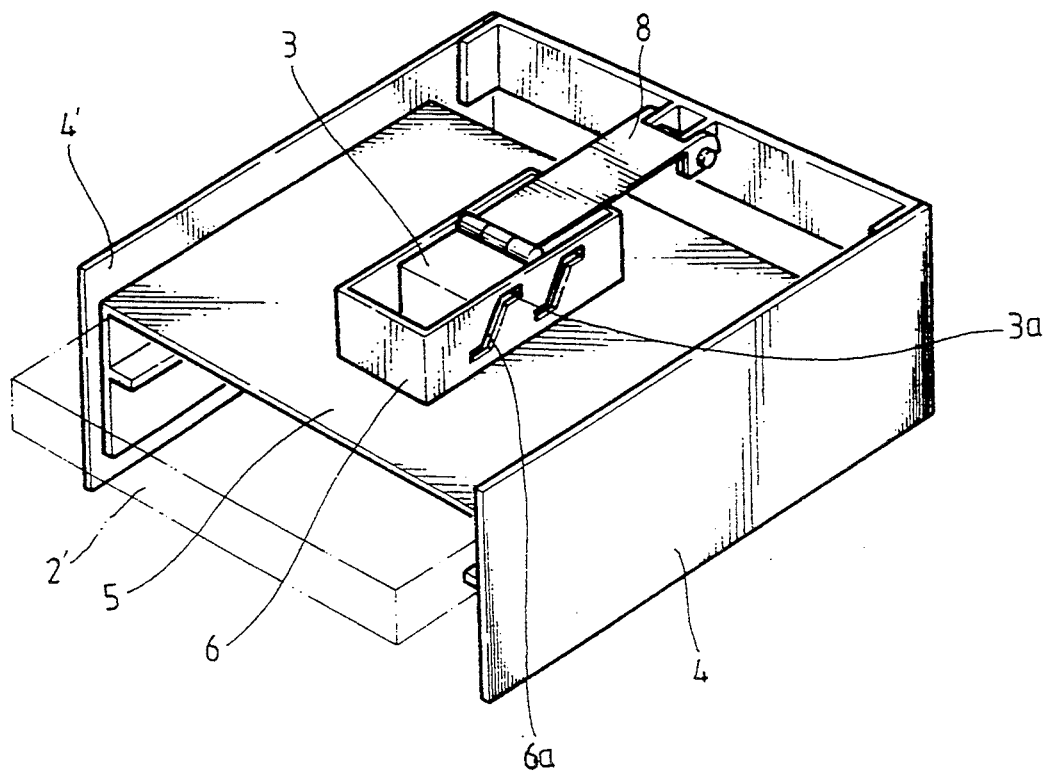
FIG. 2 is a perspective view showing the loading structure of the conventional bias magnet.
Figure 3:
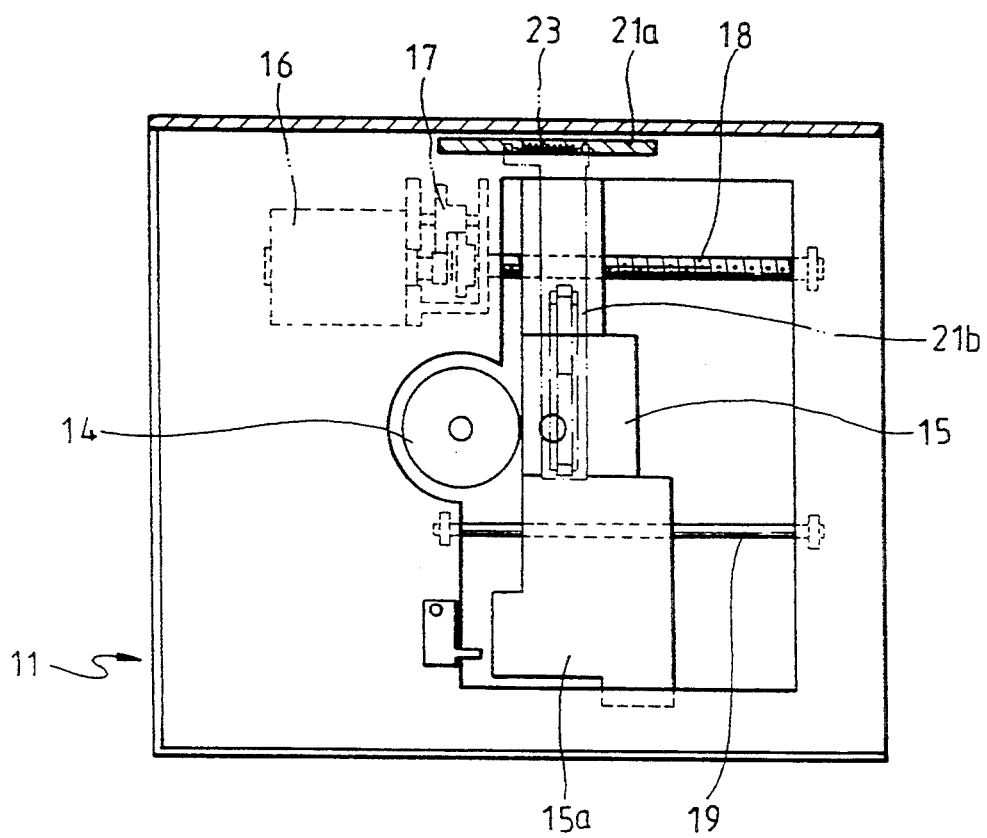
FIG. 3 is a partially extracted front view of a recording/reproducing apparatus for a magneto-optical disk according to the present invention.

Referring to FIGS. 3 to 6, in a housing 11 are mounted a spindle motor 12, and a turntable 14 on which a magneto-optical disk 13 is loaded and which is rotated by spindle motor 12. Magneto-optical disk 13 is loaded on turntable 14 through an opening 11b of housing 11.

Under magneto-optical disk 13 is installed an optical pickup 15 which is loaded on carriage 15a which in turn is supported by a feeding screw 18, which is rotated via a group of gears 17 driven by a feeding motor 16, and a guide rod 19 parallel thereto. Accordingly, the carriage 15a is movably installed.

Over the magneto-optical disk 13 and in opposition to optical pickup 15 is located a magnetic head 20 for applying an external magnetic field to the magneto-optical disk 13. Magnetic head 20 is connected with the carriage 15a of optical pickup 15 via a connecting member 21 so as to be conveyed together.

Connecting member 21 has an L-shaped movable portion 21a fixed to the carriage 15a of optical pickup 15 and an I-shaped support portion 21b which supports magnetic head 20. Support portion 21b is connected with L-shaped portion 21a by means of a hinge 25, and rotates in the opening and closing directions of door 11a. A torsion spring 23 is mounted on hinge 25, thereby tension-biasing the support portion 21b in the closing direction of door 11a. Support portion 21b has a plate spring 22 for elastically biasing magnetic head 20 toward magneto-optical disk 13. Between L-shaped portion 21a and support portion 21b is installed a rib 21c for maintaining support portion 21b to be parallel to magneto-optical disk 13.

A door 11a for opening and closing the opening 11b is hinged to one side of main body 11 on the top thereof. A guide member 24 is installed on the inner surface of door 11a. Guide member 24 is able to rotate support portion 21b of connection member 21 together with door 11a, and comes in slidable contact with one end of support portion 21b so that the support portion 21b and the L-shaped portion 21a are moved together with carriage 15a in the tracking direction.

The operation of the recording/reproducing apparatus for a magneto-optical disk according to the present invention will be described below.

Figure 4:
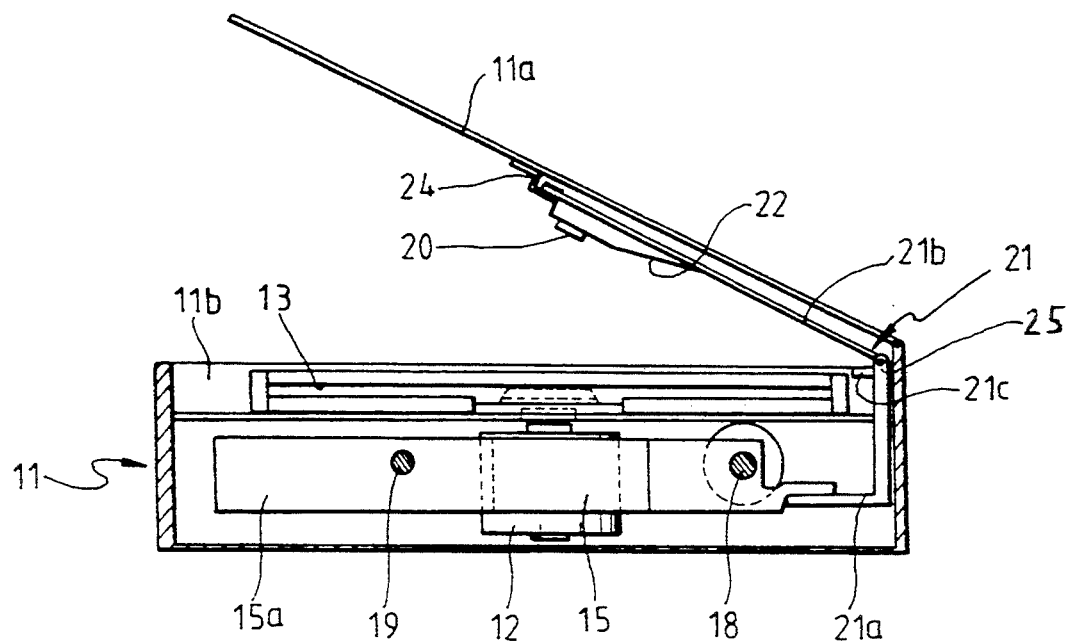
FIG. 4 is a partially sectioned side view of the apparatus shown in FIG. 3 having the door opened.
Figure 5:
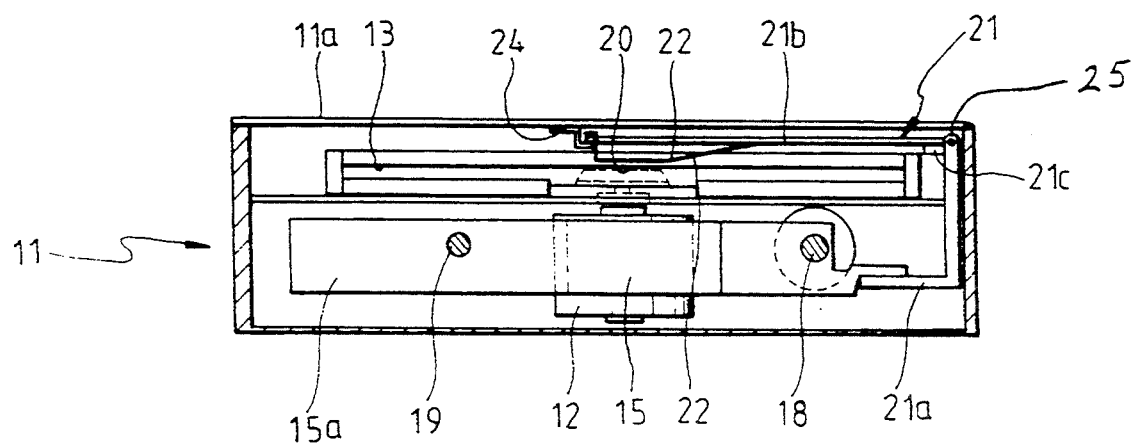
FIG. 5 is a partially sectioned side view of the apparatus shown in FIG. 3 having the door closed.
Figure 6:
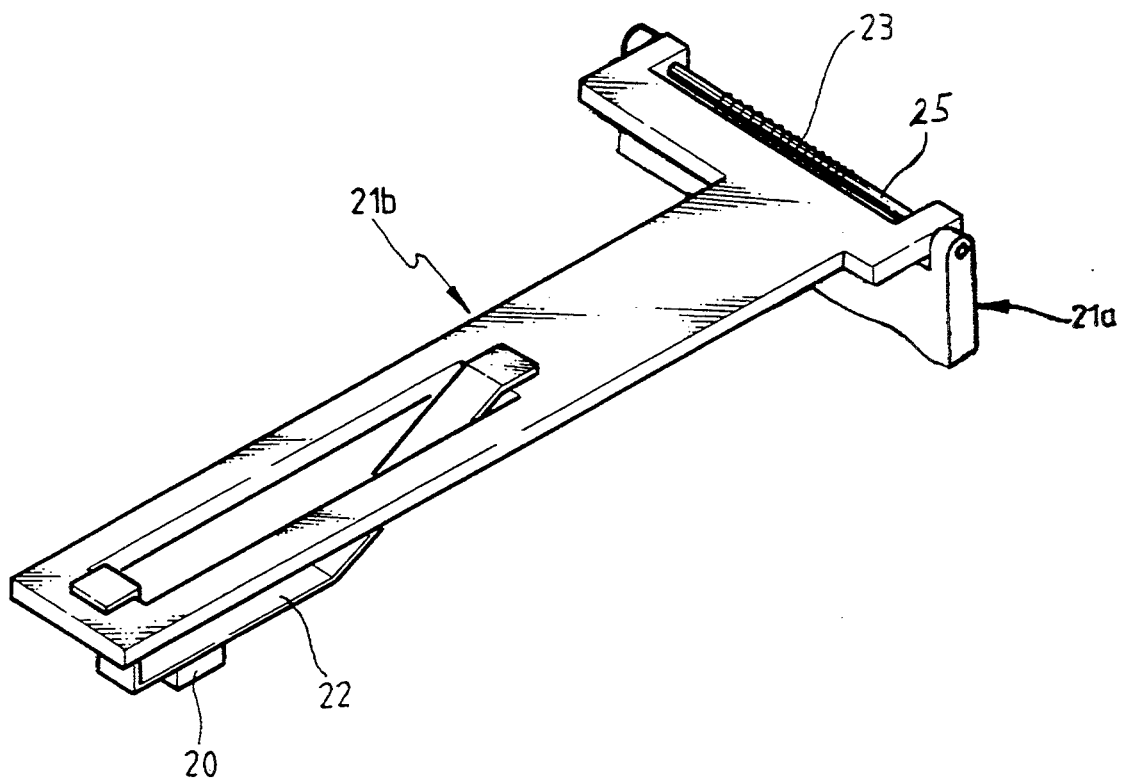
FIG. 6 is an extracted perspective view of the rotating portion of the apparatus shown in FIG. 4.

First, as shown in FIG. 4, door 11a is opened, and magneto-optical disk 13 is mounted on turntable 14 of spindle motor 12 installed inside main body 11. Then, when door 11a is closed, as shown in FIG. 5, magnetic head 20 installed on support portion 21b of connecting member 21 is elastically contiguous to magneto-optical disk 13 due to the plate spring 22. Therefore, even if the vibration of the magneto-optical disk 13 occurs during the rotation thereof, the distance between the magnetic head 20 and the magneto-optical disk 13 does not vary.

Feeding motor 16 is driven to rotate feed screw 18 so that optical pickup 15 is conveyed in the tracking direction of magneto-optical disk 13 along guide rod 19. At the same time, magnetic head 20 is conveyed together with optical pickup 15 by connecting member 21. Further, since one end of support portion 21b of the connection member 21 for supporting magnetic head 20 is guided by guide member 24, which is supported inside door 11a, the magnetic head 20 is smoothly transferred..

Accordingly, the magnetic head 20 is always in contact with magneto-optical disk 13. However, during only recording, current is applied thereby to generate flux, but during reproduction the current is cut off so as not to generate flux.

When door 11a is opened in order to remove the magneto-optical disk 13, guide member 24 installed on door 11a rotates together with support portion 21b. Accordingly, since support portion 21b is opened, the magnetic head 20 supported thereto is separated from magneto-optical disk 13 as shown in FIG.4.

As described above, in the recording/reproducing apparatus for a magneto-optical disk of the present invention, the magnetic head for applying the magnetic field to the magneto-optical disk is raised and lowered by the door, thereby enabling the apparatus to be slim-sized. Also, the magnetic head is in contact with the magneto-optical disk, thereby preventing variation of the distance of the magnetic head from the magneto-optical disk to enable a clean recording.

What is claimed is:

1. A recording/reproducing apparatus for a magneto-optical disk and having a disk driver for rotating a magneto-optical disk medium, an optical pickup for irradiating a light beam on one side of the rotating disk medium and detecting a signal from a reflected light, and a magnetization device for applying a magnetic field to an other side of the disk medium, said recording/reproducing apparatus comprising:

a housing for accommodating said disk driver and said optical pickup and having an opening for enabling the disk medium to be loaded on and unloaded from said disk driver;

a door which is rotatably hinged with one side of said housing so as to open and close the opening of said housing;

pickup driving means having a carriage on which said optical pickup is loaded to drive said carriage so that said optical pickup is moved in a radius boundary of the disk medium; and means for supporting the magnetization device on the door so that said magnetization device is moved together with said optical pickup, and at the same time is positioned farther from or closer to the disk medium according to the opening and closing, respectively, of said door, wherein said support means comprises:

a connection member having a support portion for supporting said magnetization device and a movable portion which is fixed to said carriage, one end of said support portion being hinged to said movable portion; and a guide member which is installed on said door, the other end of said support portion being slidably contacted with said guide member, and further wherein a supporting plate for supporting said support portion is formed on said connection member, so that said support portion is parallel to said disk medium when said door is closed.

2. A recording/reproducing apparatus for a magneto-optical disk and having a disk driver for rotating a magneto-optical disk medium, an optical pickup for irradiating a light beam on one side of the rotating disk medium and detecting a signal from a reflected light, and a magnetization device for applying a magnetic field to an other side of the disk medium, said recording/reproducing apparatus comprising:

- a housing for accommodating said disk driver and said optical pickup and having an opening for enabling the disk medium to be loaded on and unloaded from said disk driver;
- a door which is rotatably hinged with one side of said housing so as to open and close the opening of said housing;
- pickup driving means having a carriage on which said optical pickup is loaded to drive said carriage so that said optical pickup is moved in a radius boundary of the disk medium; and
- means for supporting the magnetization device on the door so that said magnetization device is moved together with said optical pickup, and at the same time is positioned farther from or closer to the disk medium according to the opening and closing, respectively, of said door, wherein said support means comprises:

- a connection member having a support portion for supporting said magnetization device and a movable portion which is fixed to said carriage, one end of said support portion being hinged to said movable portion;
- a guide member which is installed on said door, the other end of said support portion being slidably contacted with said guide member; and
- an elastic member for elastically biasing said magnetization device so that said magnetization device is elastically in contact with said disk medium when said door is closed.

* * * * *